(12) United States Patent
Santiago Fernandez et al.

(10) Patent No.: US 10,809,929 B2
(45) Date of Patent: Oct. 20, 2020

(54) COMBINED HARDWARE/SOFTWARE-ENFORCED SEGMENTATION OF MULTI-TENANT MEMORY/STORAGE SYSTEMS

(71) Applicant: International Business Machines Corporation, Armonk, NY (US)

(72) Inventors: William Santiago Fernandez, Poughkeepsie, NY (US); Tamas Visegrady, Zurich (CH); Silvio Dragone, Olten (CH); Nihad Hadzic, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/205,607

(22) Filed: Nov. 30, 2018

(65) Prior Publication Data
US 2020/0174688 A1    Jun. 4, 2020

(51) Int. Cl.
*G06F 3/06* (2006.01)
*G06F 13/28* (2006.01)

(52) U.S. Cl.
CPC .......... *G06F 3/0644* (2013.01); *G06F 3/0604* (2013.01); *G06F 3/0673* (2013.01); *G06F 13/28* (2013.01)

(58) Field of Classification Search
CPC .... G06F 3/0644; G06F 3/0604; G06F 3/0673; G06F 13/28
USPC .......................................................... 711/163
See application file for complete search history.

(56) References Cited

U.S. PATENT DOCUMENTS

| | | | |
|---|---|---|---|
| 6,324,597 B2 | 11/2001 | Collier | |
| 2010/0217946 A1 | 8/2010 | Condorelli et al. | |
| 2012/0036289 A1* | 2/2012 | Go | G06F 13/28 710/23 |
| 2012/0278803 A1 | 11/2012 | Pavlov | |
| 2012/0278820 A1 | 11/2012 | Dayka et al. | |
| 2013/0124929 A1* | 5/2013 | Harada | G06F 11/00 714/49 |
| 2014/0068137 A1 | 3/2014 | Kegel et al. | |

(Continued)

OTHER PUBLICATIONS

Anonymous; "TEE (Trusted Execution Environment) System Architecture version 1.1"; Global Plattorm (GPD SPE 009), Jan. 2017; 43 pages.

(Continued)

*Primary Examiner* — Than Nguyen
(74) *Attorney, Agent, or Firm* — Cantor Colburn LLP; Edward Wixted

(57) ABSTRACT

System, methods, and media are provided for enforcing segmentation of multi-tenant data. An example method includes informing hardware of direct memory access (DMA) segmented regions, in which the hardware is informed of software-specified size and count parameters relating to DMA windows. Identifying an originating DMA window for each DMA descriptor and referenced data. Verifying that contents of one or more DMA transfers are entirely from memory controlled by a single process. Setting DMA window-describing registers based the software-specified size and count parameters. Enforcing restrictions, based on the DMA window-describing registers, for DMA requests relating to the DMA windows as DMA requests are received.

25 Claims, 8 Drawing Sheets

(56) References Cited

U.S. PATENT DOCUMENTS

| | | | |
|---|---|---|---|
| 2014/0189169 A1* | 7/2014 | Litch | G06F 13/28 710/22 |
| 2017/0091487 A1 | 3/2017 | Lemay | |
| 2017/0093853 A1 | 3/2017 | Boivie et al. | |
| 2017/0329731 A1* | 11/2017 | Zebchuk | G06F 13/28 |
| 2017/0344510 A1* | 11/2017 | Park | G06F 13/4282 |
| 2018/0129616 A1* | 5/2018 | Liang | G06F 13/28 |
| 2018/0203815 A1* | 7/2018 | Rochford | G06F 13/28 |
| 2018/0329841 A1* | 11/2018 | Maeda | G06F 13/28 |

OTHER PUBLICATIONS

Anonymous; "Address Translation Services Revision 1.1"; PCI Special Interest Group (PCI-SIG), Jan. 26, 2009; 54 pages.

Anonymous; "IBM Power Systems SR-IOV (Single-Root I/O Virtualization) Technical Overview and Introduction"; (Redpaper 5065), IBM, Jul. 2014; 86 pages.

Anonymous; "Implementing SR-IOV (Single-Root I/O Virtualization) on HPE ProLiant Servers with VMware vSphere"; Hewlett-Packard Enterprise, Jan. 2017; 19 pages.

Anonymous; "PowerPC 476FP Embedded Processor Data and PowerPC 470S Synthesizable Core User's Manual, Version 1.5"; International Business Machines Corporation (IBM); Apr. 2011; pp. 99-128.

Anonymous; "Red Flat Enterprise Linux 6 Virtualization Host Configuration and Guest Installation Guide"; Red Hat Inc., Oct. 2017; 151 pages.

Anonymous; "TEE (Trusted Execution Environment) Protection Profile version 1.2"; GlobalPlafform Device Committee, (GPD SPE 021), Nov. 2014; 99 pages.

Anonymous; "vSphere Networking Guide: VMware vSphere 65, VMware ESXi 6.5, vCenter Server 6.5"; (EN-002315-03), Jul. 2017; 246 pages.

Chen et al.; "SgxPectre Attacks: Stealing Intel Secrets from SGX Enclaves via Speculative Execution"; ArXiv Computer Research Repository (CORR), abs/1802.09085, Jun. 3, 2018; 16 pages.

Cheng et al., "Protecting In-memory Data Cache with Secure Enclaves in Untrusted Cloud", Cyberspace Safety and Security, 9th International Symposium, CSS 2017, Proceedings: Oct. 23-25, 2017 (Abstract Only), 1 page.

Mell et al.; "The NIST Definition of Cloud Computing- Recommendations of the National Institute of Standards and Technology"; U.S. Department of Commerce; Sep. 2011; 7 pages.

Zhang et al.; "SoK: A Study of Using Hardware-assisted Isolated Execution Environments for Security"; In Proceedings of Hardware and Architectural Support for Security and Privacy (HASP'16), Jun. 2016; 8 pages.

"Intel Virtualization Technology for Directed I/O" Intel; Architecture Specification: Rev. 3.1; Jun. 2019 (285 pages).

Accelerated Graphics Port "AGP V3.0 Interface Specification" Revision 1.0; Sep. 2002 (143 pages).

Anonymous; "PCI-SIG Single Root I/O Virtualization (SR-IOV) Support in Intel® Virtualization Technology for connectivity" Intel Corporation Networking Division; Jan. 2010; 4 pages.

Anonymous; "SR-IOV (Single-Root I/O Virtualization) Configuration Guide"; Intel Ethernet CNA X710 and XL710 on Red Hat Enterprise Linux 7, Intel Corporation Networking Division, Oct. 2014; 22 pages.

BSI "Advanced security mechanisms for machine readable travel documents" Technical Guideline TR-03110-1; Version 2.10; Mar. 2012 (24 pages).

\* cited by examiner

COMBINED HARDWARE/SOFTWARE-ENFORCED SEGMENTATION OF MULTI-TENANT MEMORY/STORAGE SYSTEMS

BACKGROUND

The present invention generally relates to virtualized environments, and more specifically, to hardware and software enforced segmentation of multi-tenant memory storage systems.

Software multitenancy generally refers to a software architecture in which a single software instance, executing on a sever, is configured to serve multiple tenants. A tenant generally refers to a group of users who share a common access with specific privileges to the software instance. With a multitenant architecture, a software application may be designed to provide every tenant a dedicated share of an instance to each tenant, which may include, for example, the tenant's data, configuration, user management, tenant individual functionality and non-functional properties. Multi-tenancy contrasts with multi-instance architectures, where separate software instances operate on behalf of different tenants.

SUMMARY

Embodiments of the present invention provide a computer-implemented method for enforcing segmentation of multi-tenant data. A non-limiting example of the computer-implemented method includes informing, by a computing system comprising one or more processors, hardware of direct memory access (DMA) segmented regions, in which the hardware is informed of software-specified size and count parameters relating to DMA windows. The method includes identifying, by the computing system, an originating DMA window for each DMA descriptor and referenced data. The method includes verifying, by the computing system, that contents of a DMA transfer are entirely from memory controlled by a single process. The method includes setting, by the computing system, DMA window-describing registers based the software-specified size and count parameters. The method includes enforcing, by the computing system, restrictions, based on the DMA window-describing registers, for DMA requests relating to the DMA windows as DMA requests are received by the computing system.

Embodiments of the present invention provide a system for enforcing segmentation of multi-tenant data. A non-limiting example of the system includes one or more processors configured to perform a method. A non-limiting example of the method includes informing, by the system, hardware of DMA segmented regions, in which the hardware is informed of software-specified size and count parameters relating to DMA windows. The method includes identifying, by the system, an originating DMA window for each DMA descriptor and referenced data. The method includes verifying, by the system, that contents of a DMA transfer are entirely from memory controlled by a single process. The method includes setting, by the system, DMA window-describing registers based the software-specified size and count parameters. The method includes enforcing, by the system, restrictions, based on the DMA window-describing registers, for DMA requests relating to the DMA windows as DMA requests are received by the system.

Embodiments of the invention provide a computer program product for enforcing segmentation of multi-tenant data, the computer program product comprising a computer readable storage medium having program instructions embodied therewith. The program instructions are executable by a system comprising one or more processors to cause the system to perform a method. A non-limiting example of the method includes informing, by the system, hardware of DMA segmented regions, in which the hardware is informed of software-specified size and count parameters relating to DMA windows. The method includes identifying, by the system, an originating DMA window for each DMA descriptor and referenced data. The method includes verifying, by the system, that contents of a DMA transfer are entirely from memory controlled by a single process. The method includes setting, by the system, DMA window-describing registers based on the software-specified size and count parameters. The method includes enforcing, by the system, restrictions based on the DMA window-describing registers, for DMA requests relating to the DMA windows as DMA requests are received by the system.

Embodiments of the present invention provide a computer-implemented method for enforcing segmentation of multi-tenant data. A non-limiting example of the computer-implemented method includes generating, by a computing system comprising one or more processes, DMA windows for DMA segmented regions. The method includes setting, by the computing system, DMA window-describing registers based on software-specified size and count parameters that relate to the DMA windows of the DMA segmented regions. The method includes enforcing, by the computing system, based on the DMA window describing registers, restrictions for DMA requests relating to the DMA windows as DMA requests are received.

Embodiments of the invention provide a computer program product for enforcing segmentation of multi-tenant data, the computer program product comprising a computer readable storage medium having program instructions embodied therewith. The program instructions are executable by a system comprising one or more processors to cause the system to perform a method. A non-limiting example of the method includes generating, by the system, direct memory access (DMA) windows for DMA segmented regions. The method includes setting, by the system, DMA window-describing registers based on at least the following three software-specified size and count parameters: (i) base address, (ii) byte count of region, and (iii) number of elements in array. The DMA window-describing registers are set based on the at least three parameters. The method includes enforcing, by the system, based on the DMA window describing registers, restrictions for DMA requests relating to the DMA windows as DMA requests are received.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
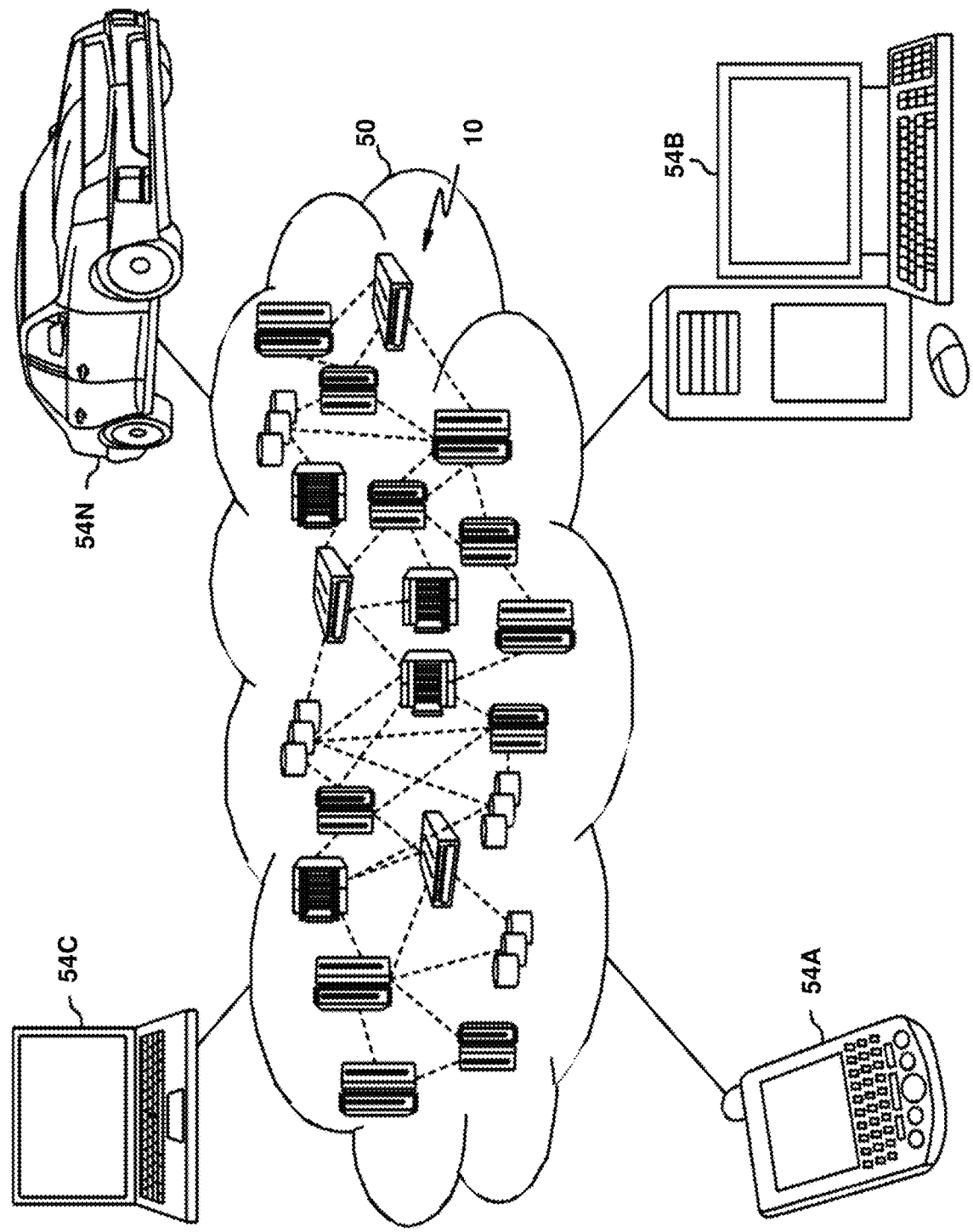
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
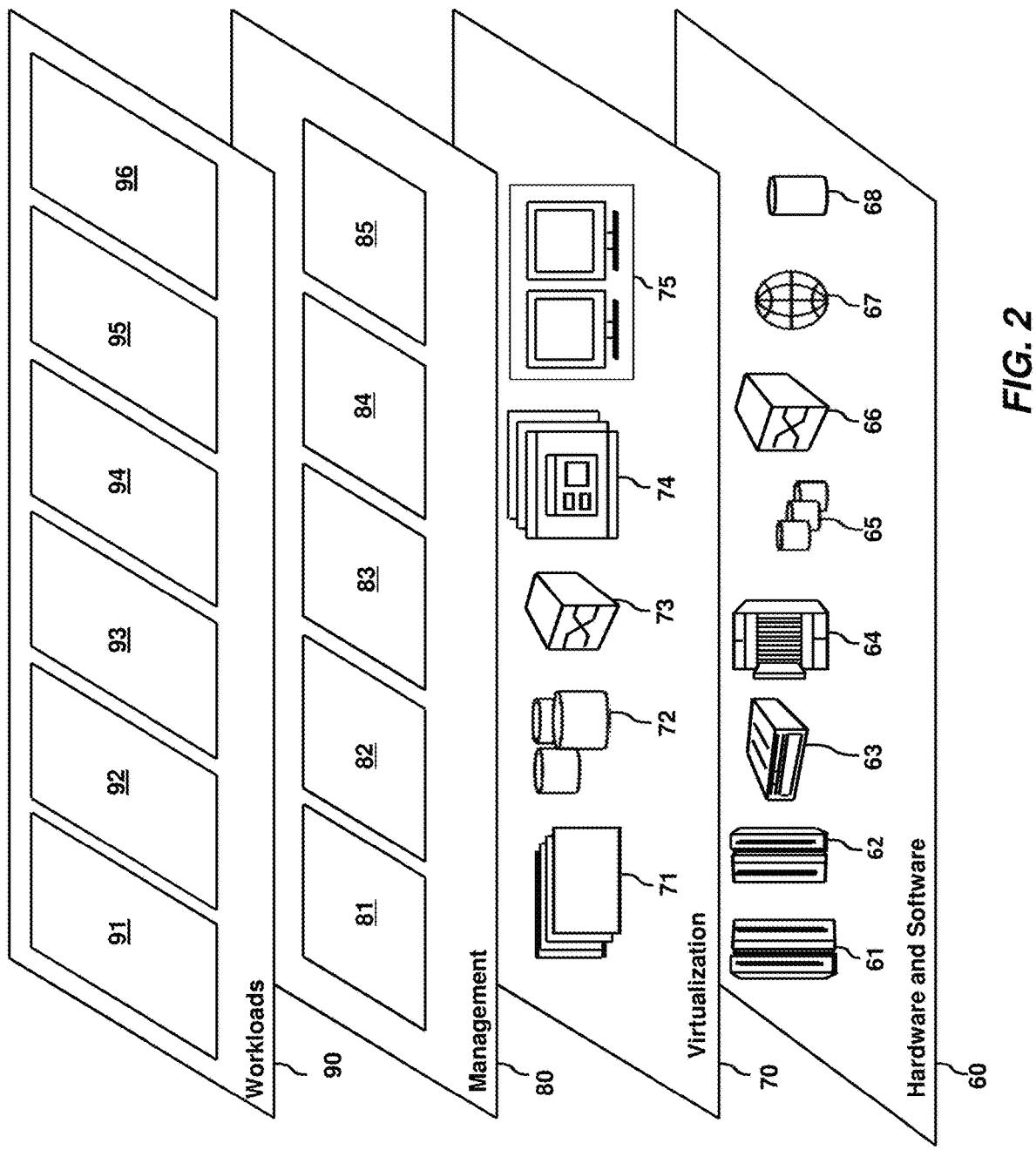
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-tenant segmentation and/or enforcement processing 96.

Turning now to an overview of technologies that are more specifically relevant to aspects of the invention, as noted above, reliable separation of multi-tenant computing systems is a unique challenge to environments that store data of virtualized clients. Software-based solutions that implement process separation can pose a security risk as some software-based solutions may be circumvented through software-based attacks. In many high-assurance applications, trustworthy separation is not obtainable as such as separation is beyond the capabilities of commodity software.

Although hardware-based virtualization methods that rely on hardware-resident secrets can be immune to certain software compromise, some hardware-based virtualization methods are inherently limited as to the number of partitions (e.g., sessions, etc.) that can be stored within the hardware (e.g., hardware registers). This limitation prohibits the scaling of hardware-based virtualization methods for high user counts, which are typical in virtualized (VM) environments. In addition to scaling limitations, device-centered hardware virtualization approaches can be further ineffective in scenarios where a single critical component needs to be subdivided as hardware enforcement by device-centered hardware may lack context to distinguish lower-level units within a single device. For example, a shared cryptographic engine might need to work with copies of security-critical keys and data structures from multiple clients, which reside in the same memory chips without hardware-observable sub-divisions thus rendering the device-centered hardware virtualization approach ineffective.

Some systems have attempted to move application-level structures into hardware-managed storage to alleviate the separation problems, however such a procedure results in creating a strong coupling between application data structures and hardware-based protections. Embedding all protection in hardware strongly limits the future-adaptability of any solution. Such embedding approaches are particularly disadvantageous in environments where programmable devices allow third parties to update software. Moreover, such embedding approaches are disadvantageous in any environment where software may need to evolve beyond data structures which specialized hardware is able to understand and protect.

Turning now to an overview of the aspects of the invention, by recognizing certain base characteristics of high-assurance security devices, one or more embodiments of the invention address the above-described shortcomings of the prior art by providing a computing system that allows for essentially an unbounded number of disjointed software entities (e.g., one or more processes, jobs, threads, etc.) to coexist in a shared environment, in which separation between the disjointed software entities is enforced by hardware. The computing system sets up a reliable hardware configuration at runtime without coordinating data structure details with hardware, which by doing so allows the computing system to scale to essentially an unlimited number of client partitions while prohibiting most attacks through use of shared hardware.

Figure 3:
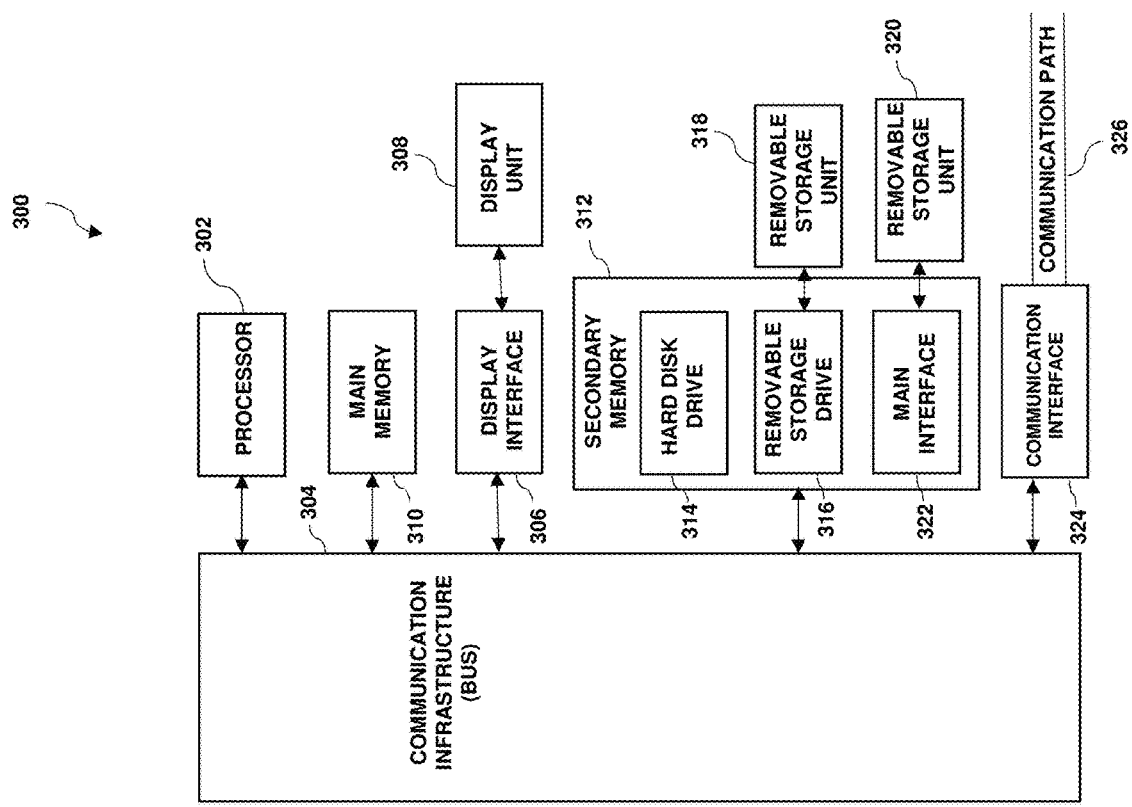
FIG. 3 depicts an exemplary computer system capable of implementing one or more embodiments of the present invention.

Turning now to a more detailed description of the present disclosure, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional system are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 that allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via a communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

High-security implementations of multi-tenant computing systems, typical in hardware security modules (HSMs), need to access shared trusted components through reliable separation of tenant data. In addition to requiring multiple request-processing entities (e.g., workers) to operate on their own sensitive and transient data structures, workers may require services of higher-valued critical data, which workers in some scenarios are not authorized to access directly (e.g., master keys or similar security-critical attributes). In some embodiments of the present invention, critical-component services offer minimalistic interfaces to workers that call them. These critical-component services are referred to herein as "microservices."

In addition to protecting software, we need to defend applications against other tenants of a same device including, for example, protecting against malicious Direct Memory Access (DMA) transfers. In some embodiments of the present invention, the computing system targets DMA transfers initiated on behalf of one tenant, which attempts to access memory belonging to another tenant via, for example, DMA transfers from software-controlled keys to shared cryptographic engines. The computing system ensures that DMA transfers combining memory from multiple processes are rejected, without the computing system needing to communicate more than the minimum of information from software to DMA-controller hardware.

Figure 6:
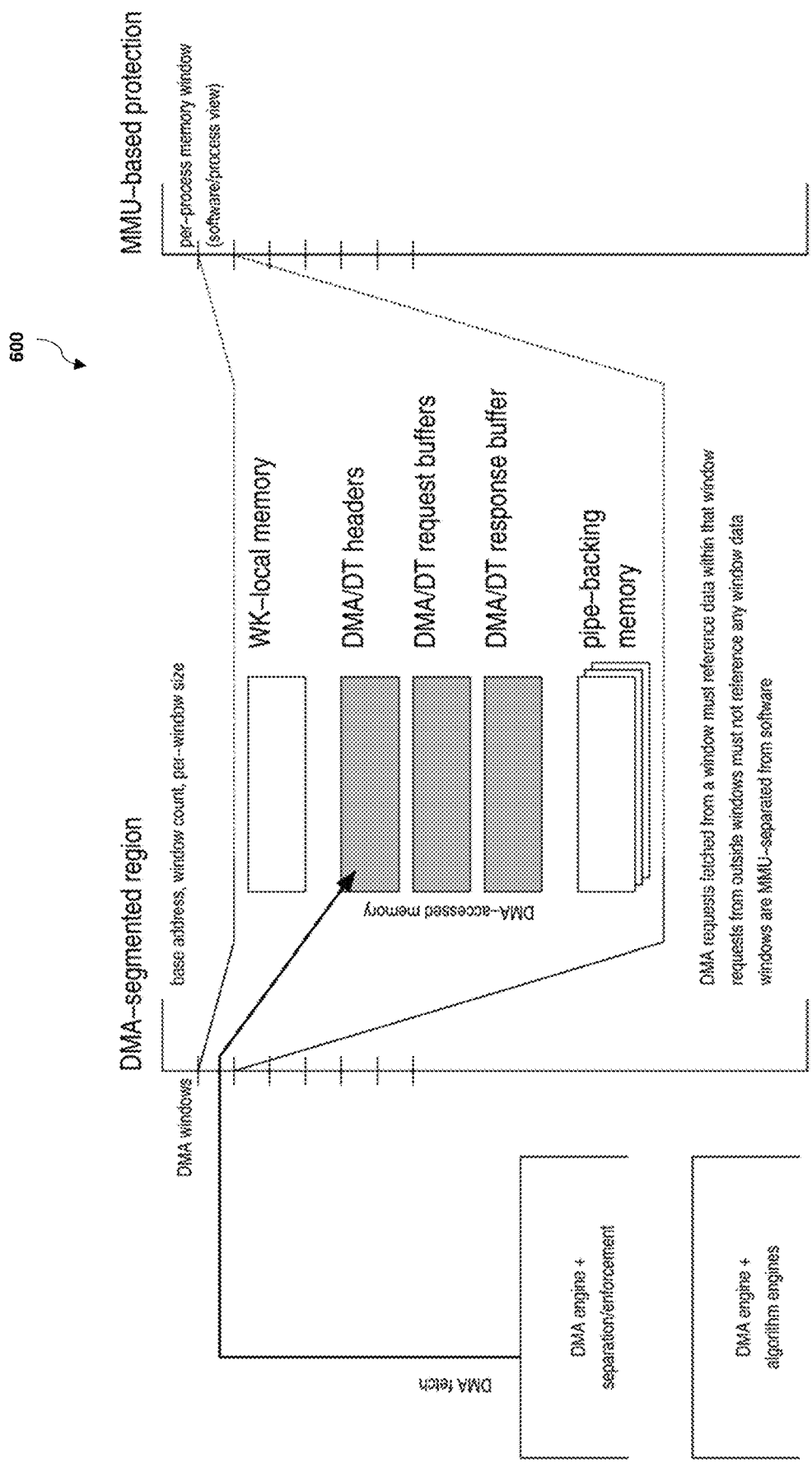
FIG. 6 depicts a block diagram of sensitive read-write memory regions of an individual microservice in accordance with one or more embodiments of the present invention.

In some embodiments of the present invention, the computing system is configured to separate data of multi-tenant computing environments and/or applications in accordance with a set of security requirements. For example, in some embodiments of the present invention, the computing system is configured to perform software-managed process separation, in which the separation is augmented by a memory management unit (MMU) of the system. The MMU is configured to provide hardware-enforced DMA memory segmentation (FIG. 6). The MMU is configured to separate all relevant entities in the system such that each given application is capable of executing within each worker and each microservice executing in its own process. Although in certain scenarios full process separation may be less efficient than thread-based separation, in some embodiments of the present invention the computing system does not allow for high assurance applications to only rely on thread-level separation (e.g., multiple threads that share memory within the same process).

In some embodiments of the present invention, an application may be refactored and/or restructured such that the application is configured to utilize sensitive data indirectly without referencing raw bits (e.g., via top-level keys). For example, in some embodiments of the present invention, applications are configured to separate their control and data flows into per-request processes and global secrets, in which the applications reference their data flows only indirectly.

Figure 4:
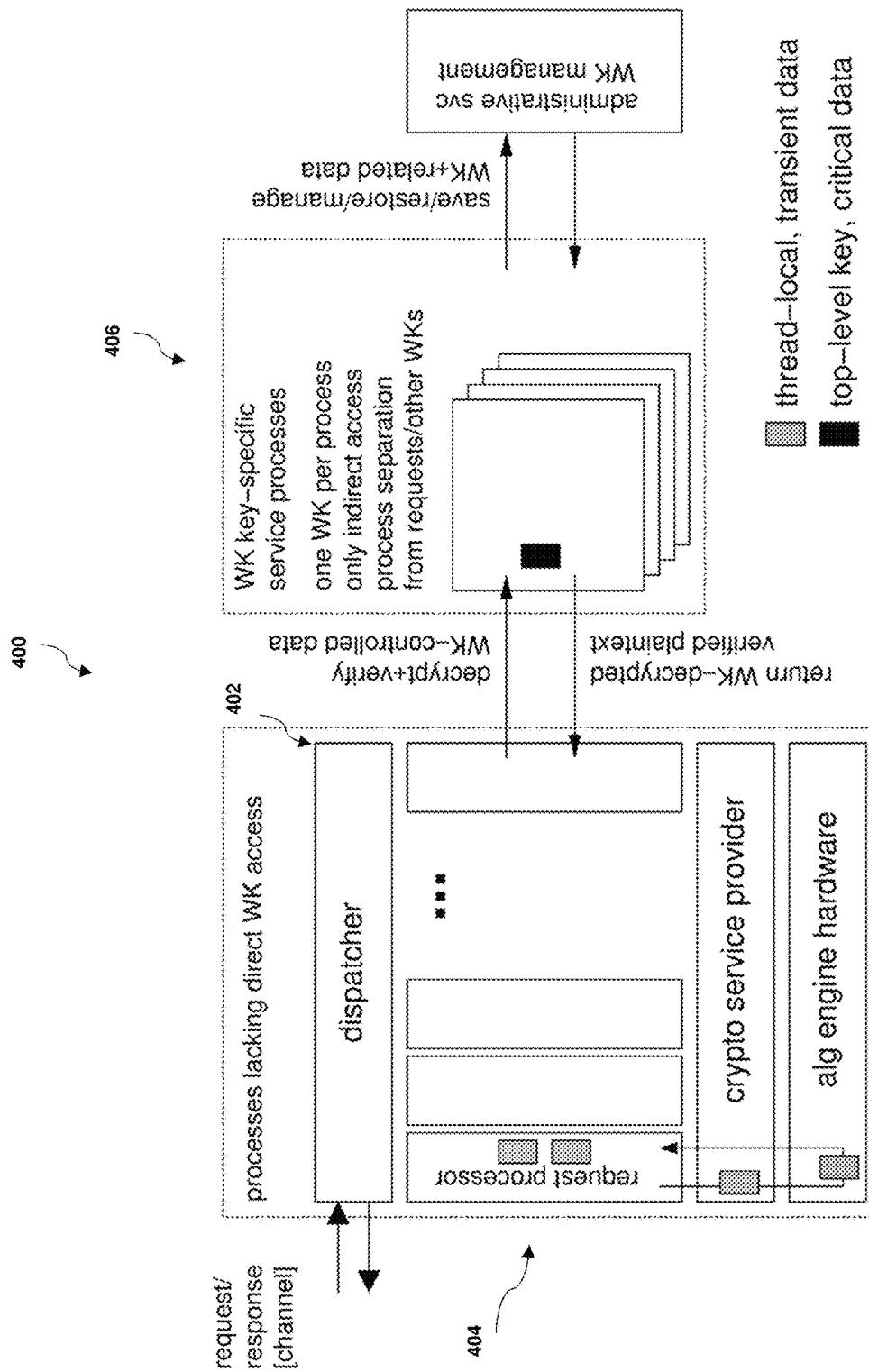
FIG. 4 depicts a block diagram of an example application in accordance with one or more embodiments of the present invention.

FIG. 4 illustrates an example application 400 in accordance with one or more embodiments of the present invention. Application 400 includes a shared dispatcher 402, a plurality of per-request processes 404, and a plurality of "wrapping keys" (WKs) 406. The keys 406 are indirectly utilized by dispatcher-activated processes 404 via a minimalistic API that is exposed by microservices of the activated processes 404, in which each microservice stores only its own sensitive data (e.g., no WK sharing). For example, consider a scenario in which decryption services are delegated to a local microservice, providing a "decrypt input with key (handle) X" API call could be utilized. An opaque key handle is not sensitive as the request/key owner processes are separated. The system enforces the separation of the actual key material that is used by the microservices in hardware.

In FIG. 4, although separated microservices may use their own secrets from software and/or pass their secrets to hardware, each microservice is configured to operate in isolation without references keys or secrets of other microservices. For example, in FIG. 4, each WK-controlling "service process" (i.e., microservice) only uses keys 406 within its own MMU-protected region and doing so possibly through directly accessing hardware engines The system provides a hardware counterpart of MMU-based software separation. In particular, the system is configured to verify DMA requests to incorporate data from (a) only the registered address window of a single microservice or request processor, or (b) from entirely outside the registered address windows. In other words, in some embodiments of the present invention, neither application processes nor microservices are allowed to set up DMA-descriptor chains that retrieve data from memory regions of other application processes or microservices.

FIG. 6 illustrates example sensitive read-write memory regions of an individual microservice 600 in accordance with one or more embodiments of the present invention. DMA hardware is used to identify DMA windows in arrays of uniformly-sized memory regions. Through use of array-based address-range checking, hardware is not required to interpret software structures and thus does not restrict hardware-software interfaces in a way which limits future expansion. For example, in some embodiments of the present invention, DMA windows are generated as arrays that control data-region sizes and/or element counts without requiring a change in hardware.

The implementation identified below illustrates an example of how such array-based address-range checking may be performed securely under software control in accordance with one or more embodiments of the present invention.

In some embodiments of the present invention, the hardware engine of the computing system is configured to provide complete pre-request separation by, for example, wiping all registers after servicing a request in a multiplexed hardware engine.

In some embodiments of the present invention, the amount of sensitive data that is to be used by each co-located entity has an upper bound that is predetermined by the computing system prior to runtime. In some embodiments of the present invention, the computing system requires arrays of identically-sized units to be set up by software, in which these arrays of memory units form the DMA windows where hardware identifies entities based on their DMA addresses. For example, in some embodiments of the present invention, software of the computing system is configured to establish per-process upper bounds on memory-window sizes during a startup operation and then to communicate the established per-processes upper bounds to the hardware. In some embodiments of the present invention, the per-process upper bounds include all locally owned storage including for example, a stack, a DMA header, and/or other auxiliary information. (FIG. 6). Various tools as known to those having ordinary skill in the art may be used to establish the upper bounds on structure sizes. Microservice APIs may be restricted to worse-case limits corresponding to the established per-process upper bound limits. In some embodiments of the present invention, the use of flexible upper bounds are disallowed such as, for example, upper bounds that are established by runtime-controller processes. Rather, in some embodiments of the present invention, the computing system is configured to predetermine cryptographic key sizes and accelerator interfaces, which provide offline-known worse-case scenario limits within a reasonable confidence.

In some embodiments of the present invention, the computing system includes memory that is sufficiently large to store large arrays of worse-case-sized structures (e.g., worse-case byte counts). For example, in some embodiments of the present invention, if a cryptographic application uses tens of kilobytes of per-microservice secrets (i.e., gross size, see FIG. 6), and if thousands of these application cryptographic applications are to be supported by the computing system, then the memory requirement of the computing system could amount to a megabyte range of total memory in various embedded environments.

Figure 5:
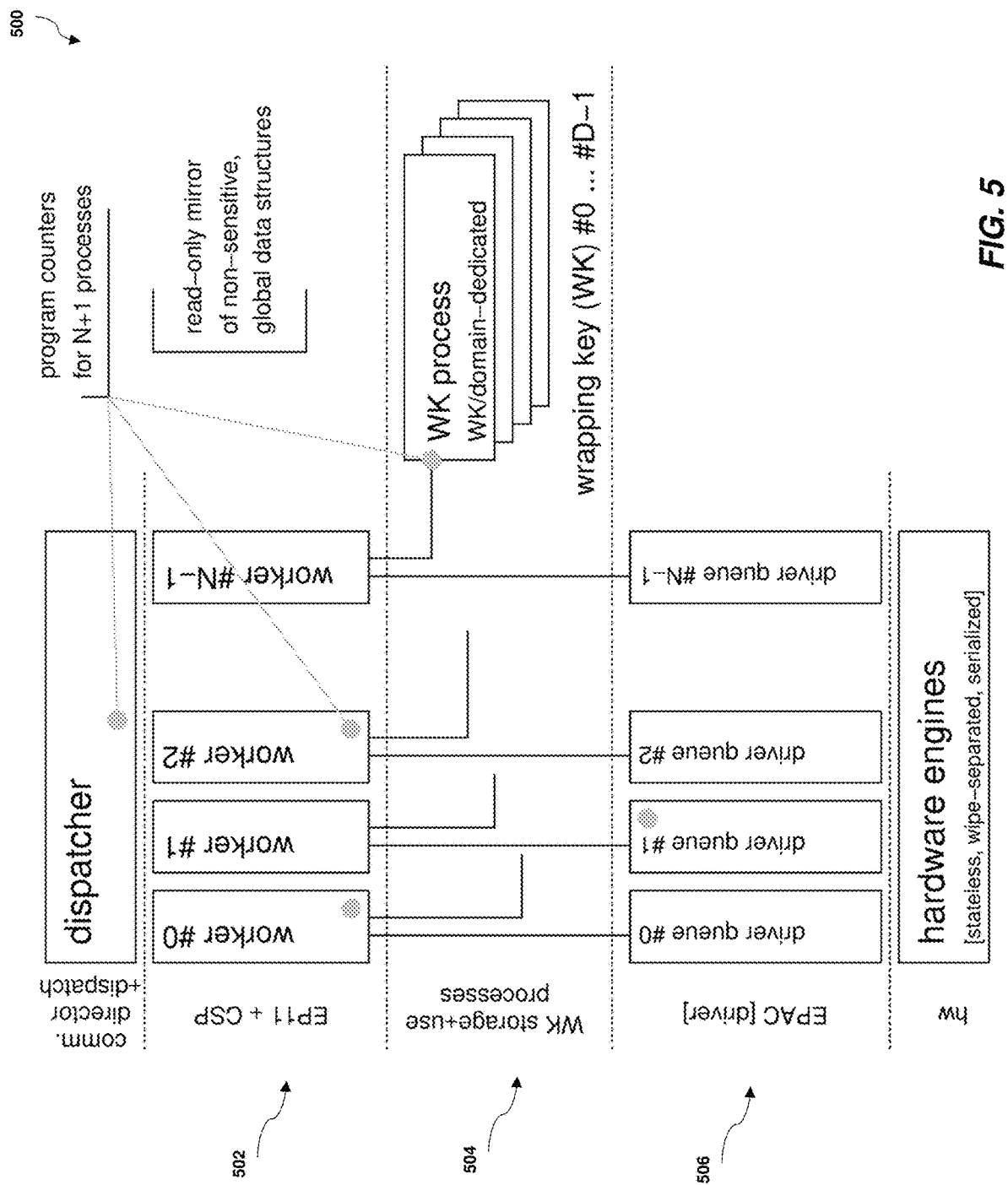
FIG. 5 depicts a block diagram of example execution states of the example application of FIG. 4 in accordance with one or more embodiments of the present invention.

While multiple concurrent requests may be processed in the same hardware device at runtime, in some embodiments of the present invention, each innovation is uniquely identified by a program counter (PC) irrespective of whether the request is for data from a microservice (see FIG. 5), or whether a per-request or micro service calls are issued to hardware. The computing system utilizes the pre-established upper bound limits on the number of outstanding DMA requests and communicates the information to the hardware. FIG. 5 illustrates example execution states of an example application 500 in accordance with one or more embodiments of the present invention. In FIG. 5, a first execution state is request processor 502, the second execution state is in WK-managing processes when requesting WK-related services 504, and the third executing state is in device driver and/or engine content 506. In this example, the example device driver is EPAC, in which the figure shows how EPAC resources are also dedicated to each per-request process. FIG. 5 in this example shows how many of the number of outstanding DMA requests is limited to N in this example, regardless of the number of domains (D), in which the domains are the partitions.

Figure 7:
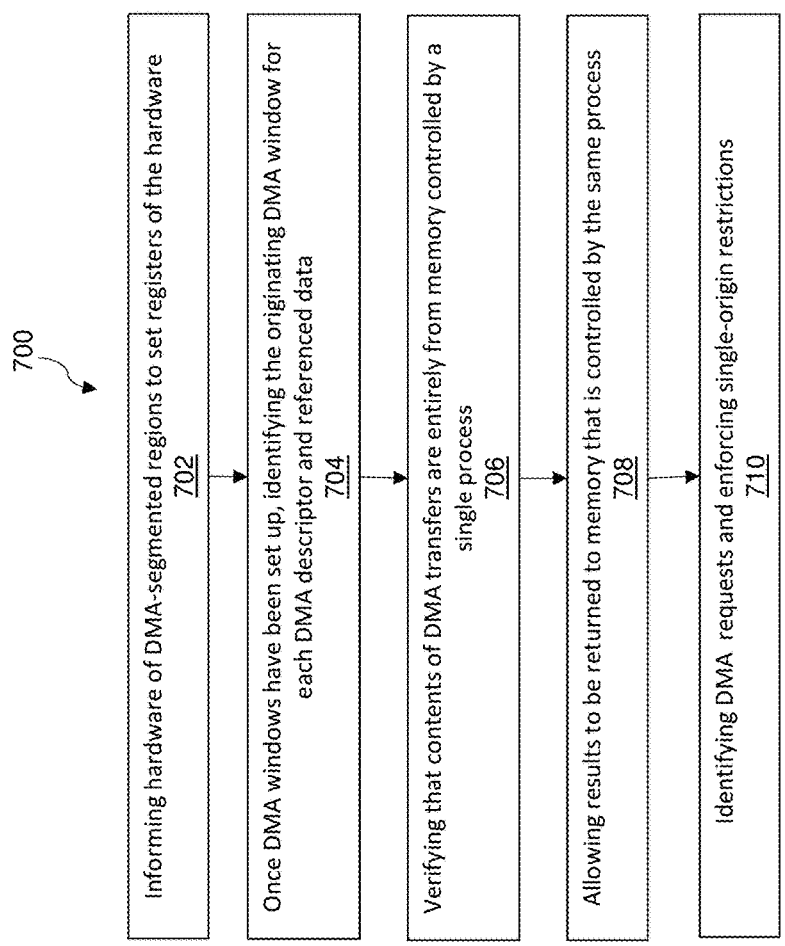
FIG. 7 depicts a flow diagram illustrating a methodology in accordance with one or more embodiments of the present invention.

FIG. 7 depicts a flow diagram illustrating a methodology 700 that may be implemented by a system according to one or more embodiments of the present invention for setting up and enforcing memory protection for partitioned memory of multi-tenant systems by software via a hardware Application Program Interface (API). At 702, hardware is informed of DMA-segmented regions to set registers of the hardware, in which segmentation covers arrays of DMA windows of a software-specified size and count (See FIG. 6). For example, in some embodiments of the present invention, for each give DMA window that is to be setup, the hardware is informed of the following three parameters for the DMA window: (a) a base address of the window; (b) a byte count of each window or a byte count of the entire region; and (c) number of elements in array. The parameters relating to the byte count of each window and the byte court of the entire region may convey the same information. This data representation allows for fast association between DMA addresses and windows via a single range check and an integer division (e.g., via a power-of-two, which is expected to be free in hardware). The nature of DMA windows allows hardware to reliably separate windows even without actual window-limit arrays being stored in hardware. In other words, as the hardware interface describes arrays with only three parameters, the interface is not restricted from increasing the number of elements beyond limits imposed by memory size.

In some embodiments of the present invention, the computing system sets up these hardware registers during a one-time, initial activity such as during startup of the device. For example, in some embodiments of the present invention, DMA windows are set by software exactly once during startup before any requests are serviced. After setting up DMA windows, window-describing registers become read-only for software. As software is prevented from subsequent modifications by the read-only window describing registers regardless of software privilege level, the computing system may demonstrate the correctness of separation to interested counterparties. For example, in some embodiments of the present invention, counterparties can verify that hardware separation is properly set up before seeding keys into their respective processes. The DMA window setup is retained until the device is reset. In some embodiments of the present invention, hardware of the computing system includes a mechanism to enforce a setup-window such that after a first time a processor switches from a privileged mode into a "less-privileged" mode (e.g., handing over from operating system to application control), the setup capabilities are disabled.

Figure 8:
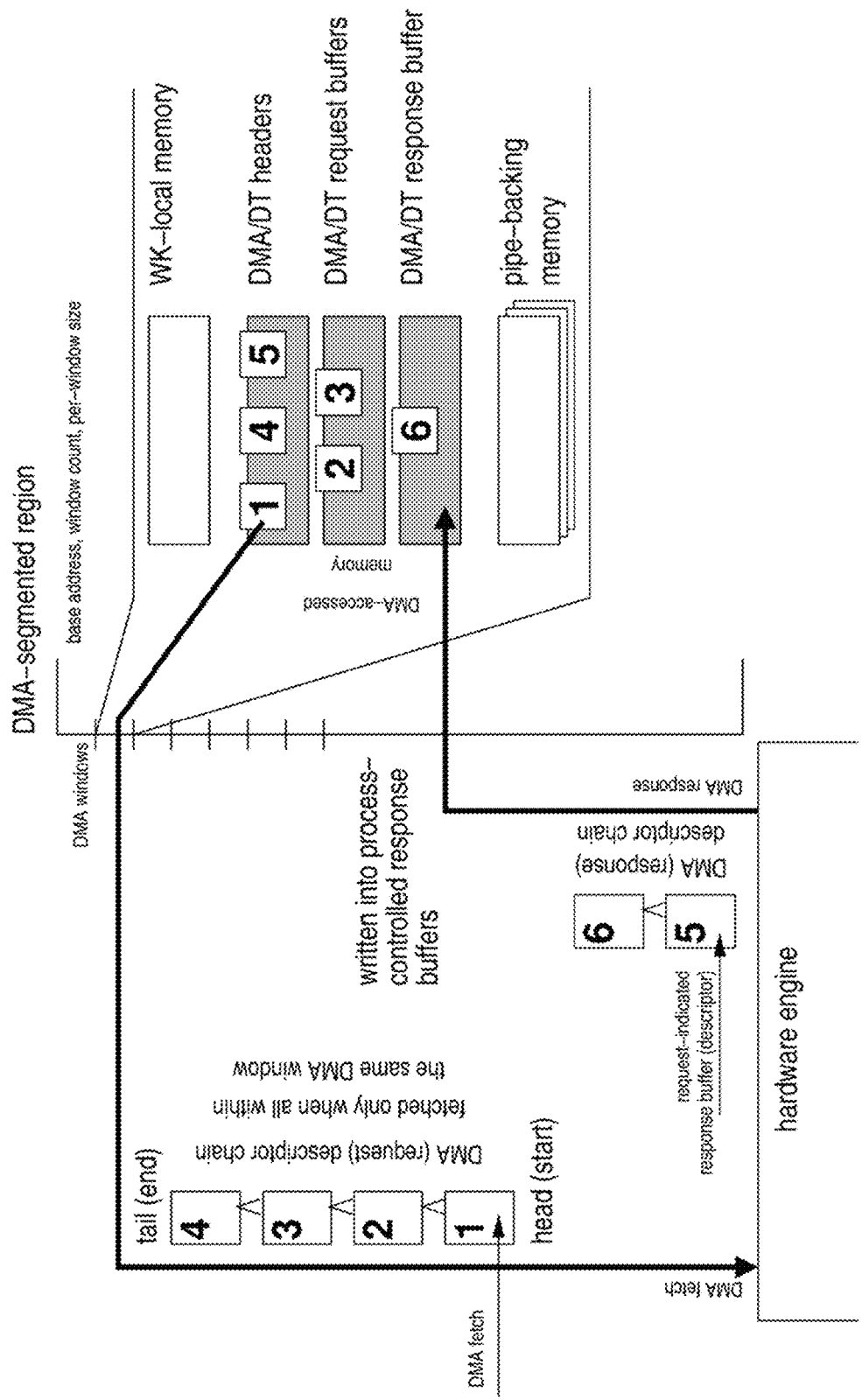
FIG. 8 depicts a block diagram of DMA descriptor chains in process-to DMA transfers in accordance with one or more embodiments of the present invention.

At 704, once DMA windows have been set up, the DMA controller identifies the originating DMA window for each DMA descriptor, and identifies the data that the window references. Hardware prevents DMA requests from combining data into a single request from multiple windows. FIG. 8 illustrates of DMA descriptor chains in process-to DMA transfers for verifying that contents of one or more DMA transfers from memory are controlled by a single process, in accordance with one or more embodiments of the present invention. In particular, (a) DMA descriptors and frames (1, 4, 5) are fetched from process-owned memory; (b) request data may combine process data with process-controlled structures (2, 3); and (c) responses are written into process-owned memory (6). In some embodiments of the present invention, the DMA descriptors unambiguously identify the start and end of each request (1, 4). Referring back to FIG. 7, at 706, the DMA controller verifies that contents of DMA transfers are entirely from memory controlled by a single process. For example, in some embodiments of the present invention, the computing system is configured to ensure that descriptors and data within each request originates in the same window irrespective of whether each request arrives from a different window (i.e., process).

At 708, the DMA controller allows results to be returned to memory that is controlled by the same process (e.g., the return of FIG. 8). In some embodiments of the present invention, DMA requests which start and end entirely outside DMA windows are allowed to pass by the DMA controller if all parts of the request are outside the registered windows. This allows legacy applications to coexist with processed-partitioned applications in some embodiments of the present invention as the DMA controller allows for out-of-window transfers without mixing out-of-window transfers with window-controlled transfers. At the same time, applications which are already process-partitioned may utilize DMA-window protection without interfering with legacy applications.

At 710, DMA requests are identified, and single-origin restrictions are enforced, regardless of the privilege level of the originating application. In some embodiments of the present invention, programmable systems are embedded with requested DMA-window sizes in their system binaries, or otherwise communicate their expected setup to system software of the shared device. In high-assurance devices, where firmware loading uses signed data structures, this information is embedded in metadata of firmware images in some embodiments of the present invention.

Accordingly, one or more embodiments of the present invention provide a system that is able to ensure one or more of the following security claims: (1) sensitive data of multiple processes is reliably separated via a MMU setup; (2) per-request data that resides in memory of per-request processes are visible only to a single process; (3) partitions of globally available data, which are delegated into microservices, are only available to the microservice that contains each piece (e.g., microservice run their own processes, which are protected by MMU separation); (4) DMA hardware ensures that requests from both pre-request processes and from microservices are from a single origin by verifying DMA descriptors (or the data they reference) to be from one DMA-window entry (i.e., by implication a single process); (5) while DMA-protection ranges are established under software control, the protected ranges revert to read-only mode after initialization is complete, which allows the system to load an application; (6) and a the global administrative entity may be present that is responsible for saving and/or storing of secrets (e.g., top level keys), the global administrative entity is incapable of issuing DMA requests and thus is outside the scope of DMA-hardware-enforced protection.

As noted above, in some embodiments of the present invention, when sizes of the per-partition memory windows are comparable, the methodology minimizes underutilized memory as per-partition limits may be identifiable when the protected memory windows are created. The lack of per-partition variance allows the system to request hardware enforcement for an arbitrary number of units. The uniform sizes allows for the system to scale arrays and segment access to the arrays without sharing details of the arrays between hardware and software. In some embodiments of the present invention, as there may be wide discrepancy between the amount of worst-case memory use scenarios of partition-owned objects, the system generalizes to multiple worse-case memory window ranges and allows applications to register for a window-size range suitable to their needs. When the methodology is extended to allow registering of different window sizes, in some embodiments of the present invention, the system replicates memory-window structures for each registered window size. In some embodiments of the present invention, registering memory-window arrays includes selecting a window that is closest to the requested window size by for example, a processed performed by flexible MMUs.

In some embodiments of the present invention, the system is deployed without complete integration with the MMU, but rather relies only on the software setup communicating a proper DMA-window layout. For example, since the setup is auditable and may not change after an initial write, an improper software setup can be detected and thus this restriction does not compromise security of the device.

In some embodiments of the present invention, if the system is deployed in a tightly integrated environment (e.g., high-assurance cryptographic devices), hardware may be configured to interface with MMU-related facilities to ensure that software-initiated DMA-segmentation setup is valid. For example, if DMA-controlling hardware is aware of the MMU setup of the entire module, it is possible to both interrogate the MMU setup during initialization and reject changes that occur subsequent to initialization. As some HSMs are deployed under such controlled conditions, in some embodiments of the present invention the system is configured to be implemented with such additional checks.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for enforcing segmentation of multi-tenant data comprising:
    informing, by a computing system comprising one or more processors, hardware of direct memory access (DMA) segmented regions, wherein the hardware is informed of software-specified size and count parameters relating to DMA windows;
    identifying, by the computing system, an originating DMA window for each DMA descriptor and referenced data;
    verifying, by the computing system, that contents of a DMA transfer are entirely from memory controlled by a single process;
    setting, by the computing system, DMA window-describing registers based on the software-specified size and count parameters; and
    enforcing, by the computing system, restrictions based on the DMA window-describing registers for DMA requests relating to the DMA windows as DMA requests are received by the computing system,
    wherein enforcing the restrictions including enforcing single-origin restrictions regardless of a privilege level of an originating application issuing the DMA request.

2. The computer-implemented method of claim 1, wherein the enforcing of the restrictions includes allowing DMA requests which start and end entirely outside DMA windows to pass.

3. The computer-implemented method of claim 1, wherein the DMA windows are in arrays of uniformly-sized memory regions.

4. The computer-implemented method of claim 1, wherein the software-specified size and count parameters include at least the following three parameters: (i) base address, (ii) byte count of region, and (iii) number of elements in array, wherein the DMA window-describing registers are set based on the at least three parameters.

5. The computer-implemented method of claim 1, wherein the DMA window-describing registers are set by software during initialization before requests are serviced.

6. The computer-implemented method of claim 5, wherein the DMA window-describing registers become read-only after initialization.

7. A system for enforcing segmentation of multi-tenant data, the system comprising one or more processors configured to perform a method comprising:
    informing, by the system comprising one or more processors, hardware of direct memory access (DMA) segmented regions, wherein the hardware is informed of software-specified size and count parameters relating to DMA windows;
    identifying, by the system, an originating DMA window for each DMA descriptor and referenced data;
    verifying, by the system, that contents of a DMA transfer are entirely from memory controlled by a single process;
    setting, by the system, DMA window-describing registers based on the software-specified size and count parameters; and
    enforcing, by the system, restrictions based on the DMA window-describing registers for DMA requests relating to the DMA windows as DMA requests are received by the system,
    wherein enforcing the restrictions including enforcing single-origin restrictions regardless of a privilege level of an originating application issuing the DMA request.

8. The system of claim 7, wherein the enforcing of the restrictions includes allowing DMA requests which start and end entirely outside DMA windows to pass.

9. The system of claim 7, wherein the DMA windows are in arrays of uniformly-sized memory regions.

10. The system of claim 7, wherein the software-specified size and count parameters include at least the following three parameters: (i) base address, (ii) byte count of region, and (iii) number of elements in array, wherein the DMA window-describing registers are set based on the at least three parameters.

11. The system of claim 7, wherein the DMA window-describing registers are set by software during initialization before requests are serviced.

12. The system of claim 11, wherein the DMA window-describing registers become read-only after initialization.

13. A computer program product for enforcing segmentation of multi-tenant data, the computer program product comprising a computer readable storage medium having program instructions embodied therewith, the program instructions executable by a system comprising one or more processors to cause the system to perform a method comprising:
   informing, by the system comprising one or more processors, hardware of direct memory access (DMA) segmented regions, wherein the hardware is informed of software specified-size and count parameters relating to DMA windows;
   identifying, by the system, an originating DMA window for each DMA descriptor and referenced data;
   verifying, by the computing system, that contents of a DMA transfer are entirely from memory controlled by a single process;
   setting, by the system, DMA window-describing registers based on the software-specified size and count parameters, wherein the DMA window-describing registers are set by software during initializing before any requests are serviced, wherein the DMA window-describing registers become read-only after initialization; and
   enforcing, by the system, restrictions based on the DMA window-describing registers for DMA requests relating to the DMA windows as DMA requests are received by the system,
   wherein enforcing the restrictions including enforcing single-origin restrictions regardless of a privilege level of an originating application issuing the DMA request.

14. The computer program product of claim 13, wherein the enforcing of the restrictions includes allowing DMA requests which start and end entirely outside DMA windows to pass.

15. The computer program product of claim 13, wherein the DMA windows are in arrays of uniformly-sized memory regions.

16. The computer program product of claim 13, wherein the software-specified size and count parameters include at least the following three parameters: (i) base address, (ii) byte count of region, and (iii) number of elements in array, wherein the DMA window-describing registers are set based on the at least three parameters.

17. The computer program product of claim 13, wherein the DMA window-describing registers are set by software during initialization before requests are serviced.

18. The computer program product of claim 17, wherein the DMA window-describing registers become read-only after initialization.

19. A computer-implemented method for enforcing segmentation of multi-tenant data comprising:
   generating, by a computing system comprising one or more processes, direct memory access (DMA) windows for DMA segmented regions;
   setting, by the computing system, DMA window-describing registers based on software-specified size and count parameters that relate to the DMA windows of the DMA segmented regions; and
   enforcing, by the computing system restrictions based on the DMA window describing registers for DMA requests relating to the DMA windows as DMA requests are received,
   wherein enforcing the restrictions including enforcing single-origin restrictions regardless of a privilege level of an originating application issuing the DMA request.

20. The computer-implemented method of claim 19, wherein the enforcing of the restrictions includes allowing DMA requests which start and end entirely outside DMA windows to pass.

21. The computer-implemented method of claim 19, wherein the DMA windows are in arrays of uniformly-sized memory regions.

22. The computer-implemented method of claim 19, wherein the software-specified size and count parameters include at least the following three parameters: (i) base address, (ii) byte count of region, and (iii) number of elements in array, wherein the DMA window-describing registers are set based on the at least three parameters.

23. The computer-implemented method of claim 19, wherein the DMA window-describing registers are set by software during initialization before requests are serviced.

24. The computer-implemented method of claim 23, wherein the DMA window-describing registers become read-only after initialization.

25. A computer program product for enforcing segmentation of multi-tenant data, the computer program product comprising a computer readable storage medium having program instructions embodied therewith, the program instructions executable by a system comprising one or more processors to cause the system to perform a method comprising:
   generating, by the system, direct memory access (DMA) windows for DMA segmented regions;
   setting, by the system, DMA window-describing registers based on at least the following three software-specified size and count parameters: (i) base address, (ii) byte count of region, and (iii) number of elements in array, wherein the DMA window-describing registers are set based on the at least three parameters; and
   enforcing, by the system, restrictions based on the DMA window describing registers for DMA requests relating to the DMA windows as DMA requests are received,
   wherein enforcing the restrictions including enforcing single-origin restrictions regardless of a privilege level of an originating application issuing the DMA request.

* * * * *